United States Patent
Lamoureux et al.

[11] Patent Number: 6,109,365
[45] Date of Patent: Aug. 29, 2000

[54] MULTI-PURPOSE IMPACT TOOL

[76] Inventors: Roger B. Lamoureux, 10636 - Mapleglen Cres. S.E., Calgary, AB, Canada, T2J 1X2; Ian J. MacPhee, 20 Cedarwood Rise, S.W., Calgary, AB, Canada, T2W 3H9

[21] Appl. No.: 09/061,180

[22] Filed: Apr. 17, 1998

[51] Int. Cl.[7] ................................ B25D 3/00; B27L 7/00
[52] U.S. Cl. ................................ 173/90; 173/128; 173/91
[58] Field of Search ........................... 173/90, 91, 128, 173/129; 279/77; 144/195.5, 195.7, 193.1; 254/104

[56] References Cited

U.S. PATENT DOCUMENTS

| | | | |
|---|---|---|---|
| 1,204,622 | 11/1916 | Wallace | 279/77 |
| 1,998,188 | 4/1935 | Dunn | 279/77 |
| 2,802,340 | 8/1957 | Tallman | 173/129 |
| 3,581,664 | 6/1971 | Kruse | 173/90 |
| 4,280,540 | 7/1981 | Meacham | 173/91 |
| 4,308,903 | 1/1982 | Alloway | 173/91 |
| 4,327,787 | 5/1982 | Loratto | 173/91 |
| 4,350,192 | 9/1982 | Dent | 144/195.5 |
| 4,379,475 | 4/1983 | Nokes | 144/195.5 |
| 4,405,005 | 9/1983 | Zanker | 173/90 |
| 4,431,040 | 2/1984 | Fredrich et al. | 144/195.5 |
| 4,462,441 | 7/1984 | Hillinger | 254/104 |
| 4,509,573 | 4/1985 | Santmyer | 144/195.7 |
| 4,577,667 | 3/1986 | Gray et al. | 144/195.5 |
| 4,730,653 | 3/1988 | Pantone et al. | 144/195.5 |
| 4,790,392 | 12/1988 | Clements | 173/128 |
| 4,813,494 | 3/1989 | Beard et al. | 173/91 |
| 4,825,918 | 5/1989 | Meinerding | 144/195.9 |
| 5,010,647 | 4/1991 | Gray | 173/90 |
| 5,431,235 | 7/1995 | Drumheller et al. | 173/128 |
| 5,462,126 | 10/1995 | Wallace | 173/90 |
| 5,495,878 | 3/1996 | McKenen, Jr. | 144/195.5 |
| 5,768,785 | 6/1998 | Pessin | 173/90 |

FOREIGN PATENT DOCUMENTS 1200182  2/1986  Canada .

*Primary Examiner*—Peter Vo
*Assistant Examiner*—James Calve
*Attorney, Agent, or Firm*—George A. Seaby

[57] ABSTRACT

A multi-purpose impact tool, i.e. a tool for splitting wood or bricks, tamping, scraping ice of cutting trenches includes an elongated guide bar with a threaded bottom end for carrying an appropriate head, a sleeve slidably mounted on the bar for reciprocating against the head for driving the latter, and a cam lock near the top end of the sleeve locking the guide bar and sleeve together in a non-use position.

6 Claims, 5 Drawing Sheets

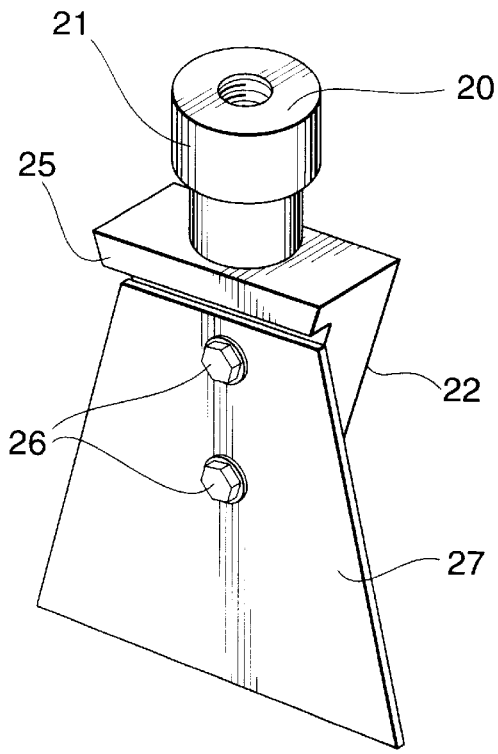
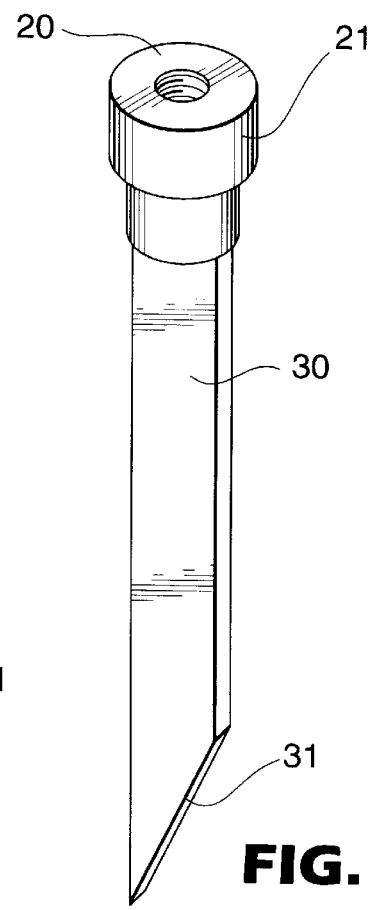
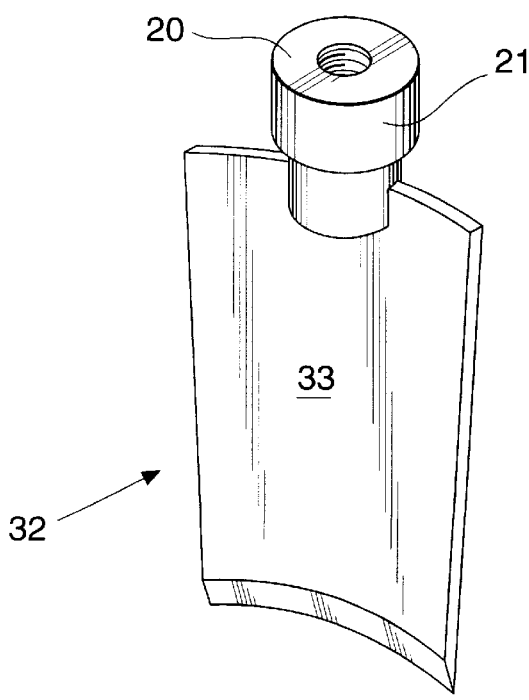
FIG. 5
FIG. 6
FIG. 7

MULTI-PURPOSE IMPACT TOOL

BACKGROUND OF THE INVENTION

1. Field of the Invention

This invention relates to a manually operated, multi-purpose impact tool.

More specifically, the invention relates to a tool designed for manual operation which can be used to perform many diverse functions including, inter alia, wood or brick splitting, ice scraping, soil tamping or trenching, survey pin driving and the forming of pilot holes for survey markers or other stakes.

2. Discussion of the Prior Art

Devices of the type described herein are the subjects of existing patents, including Canadian Patent No. 1,200,182, issued to L. Beaulieu et al on Feb. 4, 1986, and U.S. Pat. Nos. 4,280,540, issued to G. B. Kirby Meacham on Jul. 28, 1981; 4,308,903, issued to Joseph R. Alloway on Jan. 5, 1982; 4,327,787, issued to Robert J. Loratto on May 4, 1982; 4,350,192, issued to Thomas Dent on Sep. 21, 1982; 4,379,475, issued to Ronald W. Nokes on Apr. 12, 1983; 4,405,005, issued to Dieter S. Zanker on Sep. 20, 1983; 4,431,040, issued to Kenneth L. Friedrich et al on Feb. 14, 1984; 4,577,667, issued to Kevin Gray et al on Mar. 25, 1986 and 5,495,878, issued to Robert E. McKenen, Jr., on Mar. 5, 1996.

It will be noted that the patented devices are designed for splitting wood, but possess features in common with the present invention, namely a bar or rod carrying a cutting head on the bottom end thereof and a sleeve slidable on or slidably receiving the bar. However, in general, the patented devices are single purpose tools which cannot be used as scrapers, tampers or pin drivers. Moreover, some of the devices can be unsafe to use, because they lack means for preventing the shaft from escaping the sleeve when not in use. The tools that do possess a latch or lock tend to be unnecessarily complicated or cumbersome. Finally, the load bearing surface, i.e. the area of the tools bearing the force of impact is often quite small, resulting in short tool life.

SUMMARY OF THE INVENTION

An object of the present invention is to solve the problems inherent to existing devices by providing a multi-purpose impact tool, i.e. a tool which can easily be converted from one mode of operation to another.

Another object of the invention is to provide a multi-purpose impact tool including a locking mechanism, which is easy to operate, and which positively locks the relatively movable elements of the tool together when not in use.

Yet another object of the invention is to provide a multi-purpose impact tool, one version of which includes a relatively large area for absorbing the force of impact, increasing the effectiveness and life of the tool.

Accordingly, the invention relates to a multi-purpose impact tool comprising:

an elongated guide bar;

a head for mounting on a bottom end of said guide bar, said head having an impact surface at a bottom end thereof adapted to perform a desired function;

a sleeve for sliding on said guide bar, whereby the sleeve can be reciprocated against a head to perform the desired function; and cam lock means on said sleeve for releasably engaging said guide bar for preventing movement of said sleeve on guide bar when the tool is not in use.

BRIEF DESCRIPTION OF THE DRAWINGS

The invention is described hereinafter in greater detail with reference to the accompanying drawings, which illustrate preferred embodiments of the invention, and wherein:

FIGS. 5 to 10 are isometric views of a variety of heads for use on the tools of FIGS. 1 to 4.

DESCRIPTION OF THE PREFERRED EMBODIMENTS

Figure 1:
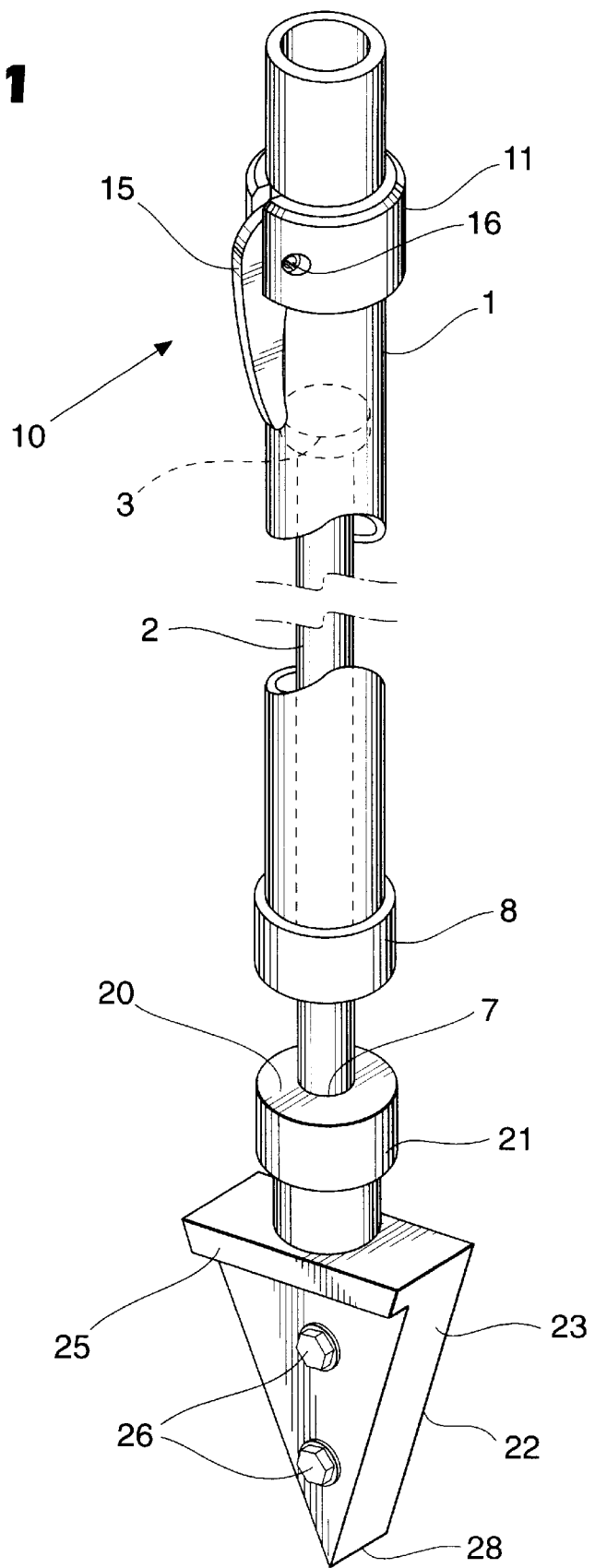
FIG. 1 is an isometric view of a multi-purpose impact tool in accordance with the present invention in the non-use condition.
Figure 2:
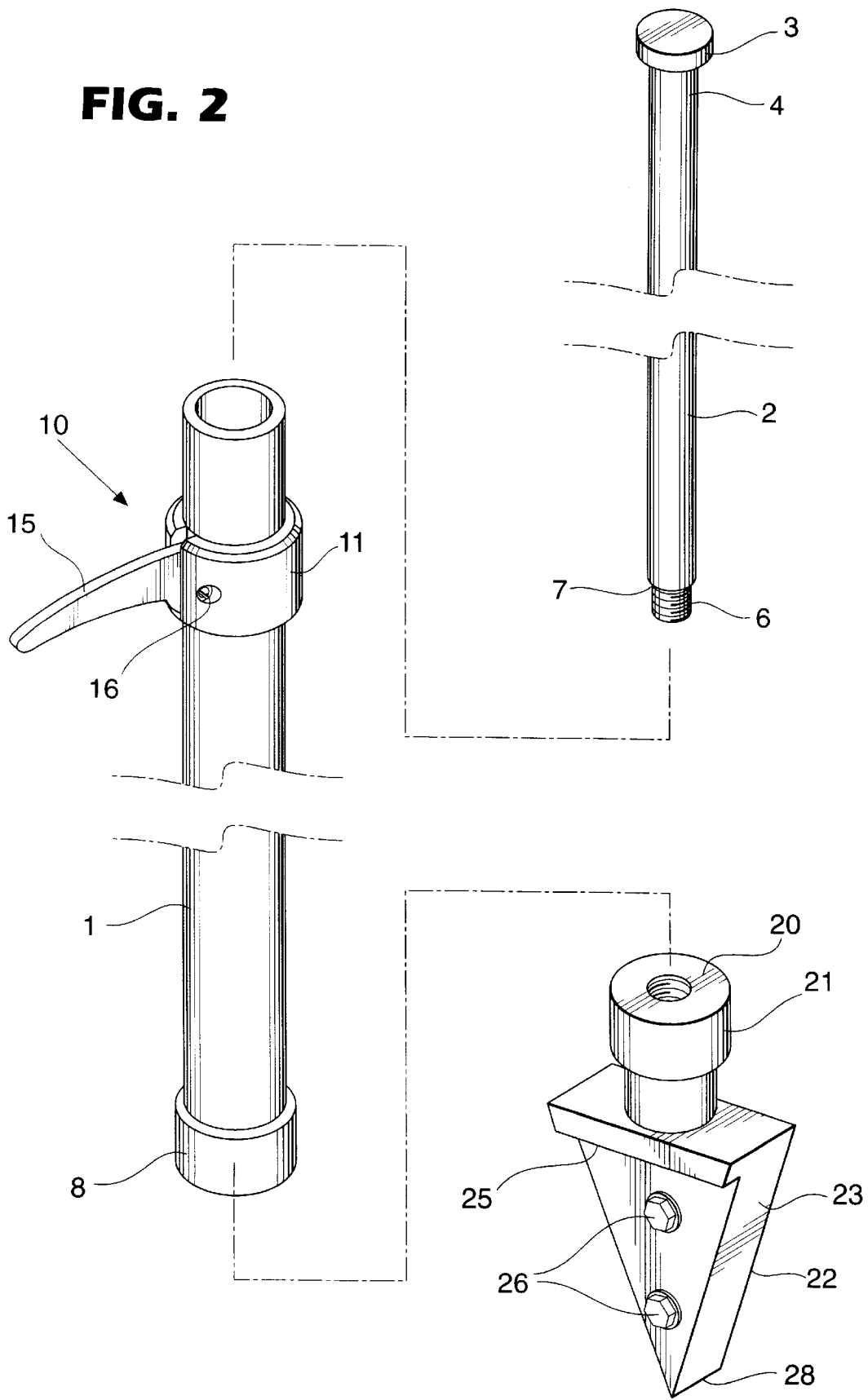
FIG. 2 is an exploded, isometric view of the tool of FIG. 1.

Referring to FIGS. 1 and 2, the basic elements of the tool of the present invention include a steel power bar or sleeve 1 slidably mounted on a steel guide bar 2. In order to reduce sliding friction, a disc 3 is provided on the top end 4 of the bar 2. The disc 3 has a diameter only slightly smaller than the interior diameter of the sleeve 1, and consequently is the only part of the bar 2 which contacts the interior of the sleeve 1. While the dimensions of the elements are not critical, in the preferred embodiment the sleeve 1 has a length of 42", an outside diameter of 1½" and an inside diameter of 1"; the bar has a length of 43" and a diameter of ¾"; and the head has a diameter of 15/16". As a result, the sleeve 1 slides smoothly and easily on the guide bar 2. As described below in greater detail, the bottom end 6 of the bar 2 is threaded in an area beneath a shoulder 7 for connecting a variety of heads to the bar 2. A collar 8 is welded onto the bottom end of the sleeve 1. The collar 8 provides an extra thickness of steel so that the contact surface of the bottom end of the sleeve 1 is as large as possible.

Figure 3:
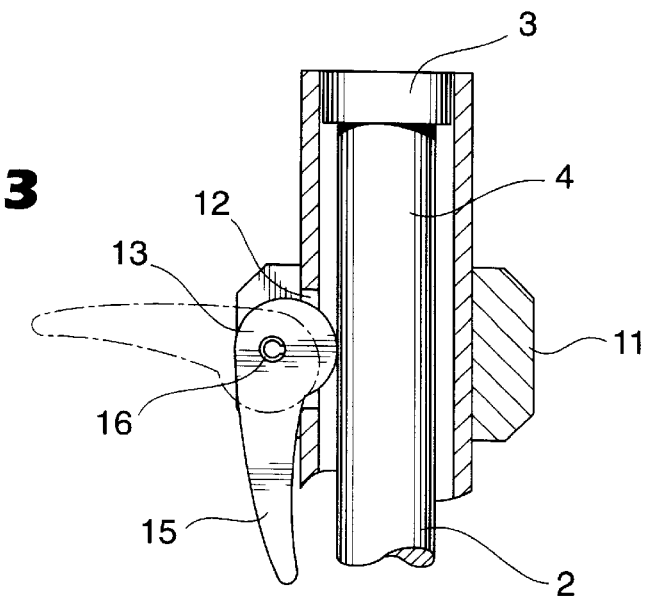
FIG. 3 is a longitudinal sectional view of a locking mechanism used in the tool of FIGS. 1 and 2.

When not in use, the bar 2 is retained in the sleeve 1 by a lock mechanism generally indicated at 10. As best shown in FIG. 3, the lock mechanism 10 is defined by a short collar 11 welded onto the sleeve 1 near the top end thereof. A slot 12 extends through the collar 11 and the sleeve 1 for receiving one end 13 of a locking lever 15. The end 13 of the lever 15 is pivotally mounted on a split pin 16 extending between the sides of the slot 12. The end 13 of the locking lever is generally semi-circular and is mounted eccentrically, so such end 13 contacts the bar 2 only when the lever 15 is flat against the sleeve 1 (FIG. 1). When the lever 15 is rotated to the open or release position (FIG. 2), there is no contact between the end 13 and the bar 2, and accordingly the bar 2 is free to slide in the sleeve 1.

The reason for using a split pin 16 is to prevent rotation of the lever 15 from the open position (FIG. 2) to the locked position (FIG. 1) when the tool is being used, i.e. when the sleeve 1 is being moved up and down on the bar 2. The pin 16 acts as a friction stop releasably holding the lever 15 in the open position. Moreover, the width of the slot 12 is only slightly larger than the width of the end 13 of the lever 15. Thus, the sides of the lever 15 are in contact with the sides of the slot 12 which also impedes rotation of the lever 15. If the lever 15 was freely rotatable on a pivot pin, the lever would flop around during use. Moreover, movement of the sleeve 1 on the bar 2 with the lever end 13 in contact with the bar 2 would quickly wear down the lever 15 destroying its locking capabilities.

In use, a head (FIGS. 1, 2 and 4 to 10) is mounted on the bottom end of the bar 2, the locking lever 15 is rotated to release the sleeve 1 from the bar, i.e. to permit relative movement between the two, and the sleeve 1 is reciprocated against the head. When the sleeve 1 forcefully impacts the head, some of the force is absorbed by the relatively small shoulder 7 above the threads on the bottom end of the bar 2. Accordingly, for industrial or heavy duty use, a cylindrical collar or head 18 (FIG. 4) is mounted on the bar 2 above the threaded bottom end thereof. With this arrangement any force of impact transmitted to the bar 2 is absorbed by the larger collar 18. Moreover, when in contact, the bottom surface 19 (FIG. 4) of the collar 18 is flush with the top surface 20 (FIGS. 1, 2 and 5 to 10) of an internally threaded sleeve 21 on the top end of each head used on the tool. The diameter of the collar 18 and of the sleeve 21 are the same, and contact between the entire bottom surface 19 of the collar 18 and the top surface 20 of the sleeve 21 results in uniform transmission of force from the sleeve 1 to the head.

Figure 4:
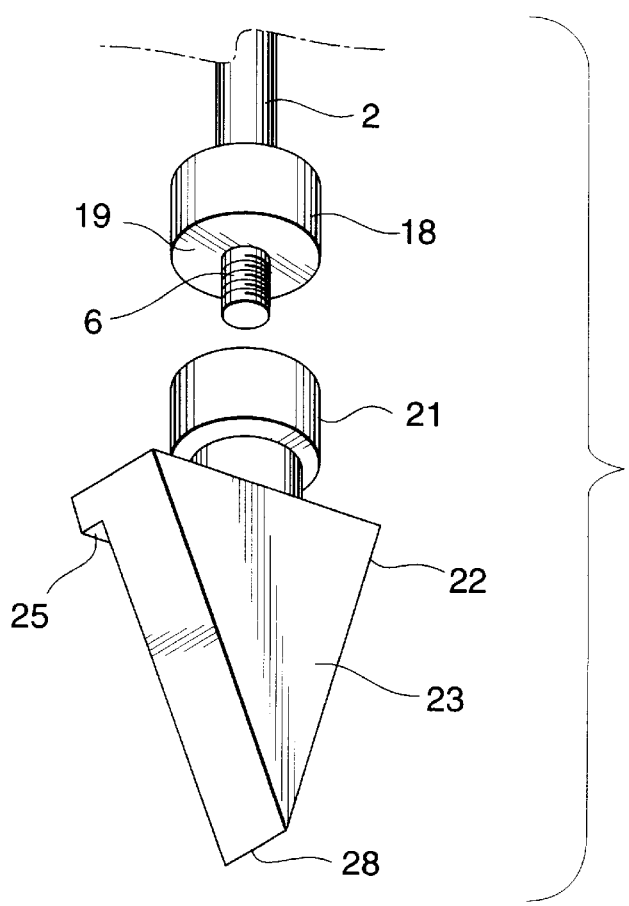
FIG. 4 is an isometric view of the bottom end of a second embodiment of the invention.
Figure 8:
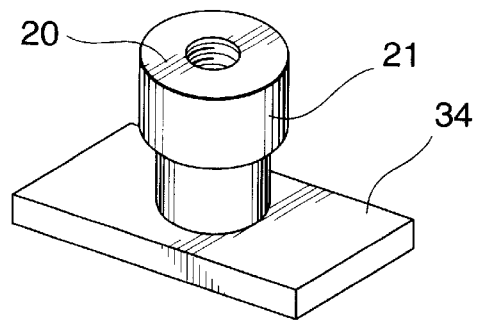
Figure 9:
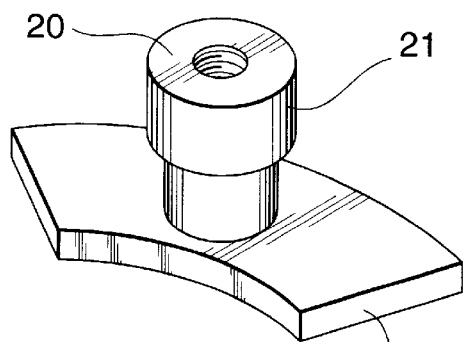

The function of the tool is dictated by the type of head which is attached to the threaded bottom end of the bar 2. Referring to FIGS. 1, 2 and 4, one form of head 22 is intended for splitting wood. The head 22 includes an internally threaded sleeve 21 at the top end of a wedge-shaped body 23 for mounting the head on the threaded bottom end of the bar 2.

A shoulder 25 extends outwardly from the top end of one side of the body 23, and a pair of longitudinally aligned bolts 26 are mounted in threaded bores (not shown) in such one side for releasably attaching an ice scraper plate 27 (FIG. 5) to the head 22. The splitter head 22 itself is used in the conventional manner. The pointed impact surface or bottom end 28 is placed against a piece of wood (not shown), and the sleeve 1 is reciprocated on the bar 2. Because the sleeve 1 is formed of steel, it is heavy, and easily drives the wedge-shaped body 23 through the wood. The bulk of the force of impact is transmitted through the shoulder 25 to the bar 2.

In order to convert the head 22 to an ice scraper, the bolts 26 are removed, and used to attach the scraper plate 27 to the head. The action of the tool is the same, i.e. the plate is placed against the ice, and the sleeve 1 is reciprocated on the bar 2.

All of the other heads which can be used on the bar 2 include internally threaded sleeves 21 at their upper ends, and an impact surface at the bottom ends thereof. The heads include an iron bar 30 (FIG. 6) with an impact surface defined by a pointed bottom end 31 which can be used for digging. A trenching head generally indicated at 32 (FIG. 7) includes a shovel-shaped body 33 attached to the sleeve 21. A square tampering head 34 (FIG. 8) is used for tamping soil, e.g. around a square post, and an arcuate tamping head 35 (FIG. 9) is used to tamp soil around a cylindrical post.

Figure 10:
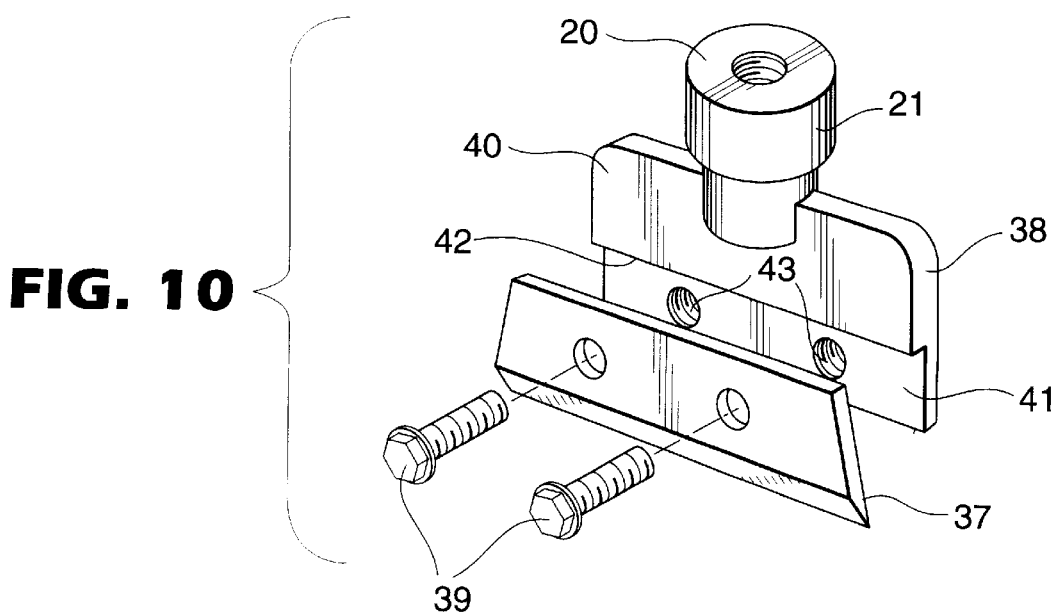

Referring to FIG. 10, another type of head is a brick splitter defined by a blade 37 attached to a multi-head 38 by bolts 39. The multi-head 38 is merely a generally rectangular body 40 with a threaded sleeve 21 on the top end thereof for mounting the head on the bar 2. A rectangular bottom ledge 41 beneath a shoulder 42 receives the blade 37. Threaded holes 43 are provided in the ledge 41 for receiving the bolts 39.

We claim:

1. A multi-purpose impact tool comprising:

an elongated cylindrical guide bar;

a guide disc on an upper end of said guide bar;

a head for mounting on a bottom end of said guide bar, said head having an impact surface at a bottom end thereof for delivering an impact force from the tool;

a steel sleeve for sliding on said guide disc, said sleeve having an open top end and an open bottom end defining a contact surface, whereby, when the sleeve is reciprocated on said guide bar, said contact surface reciprocates against said head to deliver said impact force; and cam lock means on said sleeve including a lock collar on said sleeve proximate an upper end thereof; a slot extending longitudinally of the sleeve through said lock collar and sleeve; a cam lever pivotally mounted in said slot for manual rotation between a guide bar engaging position for preventing movement of said sleeve on the guide disc when the tool is not in use, and a guide bar release position permitting use of the tool; and a split pin pivotally connecting said cam lever to said lock collar, said split pin restricting movement of said cam lever to prevent pivoting of the lever to the guide bar engaging position whereby the cam lever remains in the release position until manually returned to the guide bar engaging position.

2. The multi-purpose impact tool of claim 1, wherein said guide bar includes a threaded bottom end; and a shock absorbing collar immediately above said threaded bottom end for abutting said head attached to said bottom end beneath the sleeve, whereby, when the steel sleeve is reciprocated, the contact surface of the sleeve reciprocates against the shock absorbing collar which uniformly transmits force to the head.

3. The multi-purpose impact tool of claim 2, wherein said shock absorbing collar has a first diameter, and said head has an upper end with a second diameter the same as said first diameter.

4. The impact tool of claim 1, wherein said slot has a first width, and said cam lever has a second width only slightly less than said first width, whereby the cam lever can just pass through the slot and friction between sides of said cam lever and said slot further restricts movement of said lever.

5. The impact tool of claim 4, wherein said head includes a wedge-shaped body for splitting wood; a shoulder at a top end of one side of said body; and a scraper plate for releasable attachment to said body beneath and against said shoulder.

6. The impact tool of claim 1, wherein said head includes a generally rectangular body; a shoulder at a top end of one side of the body; and a splitter blade defining said impact surface for releasable attachment to said body beneath and against said shoulder.

* * * * *